United States Patent [19]

Grossnickle

[11] Patent Number: 5,385,246

[45] Date of Patent: Jan. 31, 1995

[54] COLLAPSIBLE BICYCLE STAND

[76] Inventor: David Grossnickle, 301 - 1166 West 6th Avenue, Vancouver, British Columbia, Canada, V6H 1A4

[21] Appl. No.: 118,222

[22] Filed: Sep. 9, 1993

[51] Int. Cl.$^6$ ............................................. A47F 7/00
[52] U.S. Cl. ...................................... 211/22; 482/61; 211/196
[58] Field of Search ................... 211/22, 17, 20, 208, 211/205, 196, 204, 189; 482/61; 248/158, 159; 280/293, 295

[56] References Cited

U.S. PATENT DOCUMENTS

| | | | |
|---|---|---|---|
| 1,043,387 | 11/1912 | Astruck | 211/196 X |
| 1,101,640 | 6/1914 | Lee | 280/295 |
| 3,931,991 | 1/1976 | Marchello | 211/22 X |
| 3,980,320 | 9/1976 | Marchello | 211/22 X |
| 3,981,491 | 9/1976 | Snyder | 211/22 X |
| 4,021,034 | 5/1977 | Olesen | 211/22 X |
| 4,572,502 | 2/1986 | Messineo | 482/61 |
| 5,016,765 | 5/1991 | Leonardo | 211/189 |

FOREIGN PATENT DOCUMENTS 7799 of 1897 United Kingdom ................... 211/22

Primary Examiner—Robert W. Gibson, Jr.
Attorney, Agent, or Firm—Bull, Housser & Tupper

[57] ABSTRACT

A collapsible bicycle stand comprises a base operable to rest on a generally horizontal surface, a support member removably securable to the base such that the support member extends upward relative to the horizontal surface, and first and second bicycle holding facilities secured to the support member. The support member has an outwardly facing portion lying in a first generally vertical plane when the support member is secured to the base and the first and second bicycle holding facilities have first and second bicycle contacting surfaces respectively, which are disposed in a second plane extending perpendicular to the first plane and which are disposed at an angle relative to the horizontal surface when the support member is secured to the base.

5 Claims, 3 Drawing Sheets

COLLAPSIBLE BICYCLE STAND

BACKGROUND OF THE INVENTION

This invention relates to a collapsible stand for use in supporting a rear wheel of a bicycle and has uses in applications such as holding a bicycle for display or for work to be performed on the bicycle.

The display of bicycles in a bicycle shop, for example, can be done in variety of ways including using kickstands on each respective bicycle or hanging the bicycles from the ceiling. The use of kickstands makes it difficult to arrange the bicycles in a neat, orderly manner pleasing to a prospective purchaser. Furthermore, the use of kickstands requires the shop owner to have access to the rear or middle of the bicycle in order to permit the kickstand to be retracted to enable the bicycle to be removed from the group of bicycles on display. This requires that the bicycles on display be spaced apart sufficiently to permit the owner to get between them. Unfortunately, this limits the number of bicycles which can be displayed in a given area, i.e. the density of the display.

Notwithstanding the above problems for the shop owner, a bicycle owner may wish to support his bicycle at home to enable work to be performed on the bicycle. Conventional methods of positioning a bicycle for work depends upon the work to be performed. Some work can be done with the bicycle lying on its side whereas other work can only be done with the bicycle supported upright. In addition some work which has heretofore been done with the bicycle lying on its side is made easier by supporting the bicycle in an upright position. Support of the bicycle in a upright position can be important for some maintenance work and therefore there is a requirement to support a bicycle in this manner.

In particular, work which requires that the rear wheel of the bicycle be removed, while enabling the pedals to rotate can only be done with the rear wheel off of the ground and with the pedals free to rotate. This can be accomplished by supporting the bicycle by its chainstay and seatstay, in an upright position such that the rear wheel is off of the ground. The present invention addresses this requirement.

SUMMARY OF THE INVENTION

According to one aspect of the invention there is provided a collapsible bicycle stand apparatus comprising a base operable to rest on a generally horizontal surface, a support member removably securable to the base such that the support member extends upward relative to the horizontal surface, and first and second bicycle holding members secured to the support member. The support member has an outwardly facing portion lying in a first generally vertical plane when the support member is secured to the base and the first and second bicycle holding members have first and second bicycle contacting surfaces respectively, which are disposed in a second plane extending perpendicular to the first plane and are disposed at an angle relative to the horizontal surface when the support member is secured to the base.

Preferably, the support member includes a straight, elongated member and the first and second bicycle holding members include first and second hooks respectively for receiving the chainstay and the seatstay respectively of a bicycle. Preferably, the first hook is secured to the outwardly facing portion, in a first hook plane extending perpendicular to the outwardly facing portion and perpendicular to the horizontal surface and the second hook is secured to the outwardly facing portion, in a second hook plane extending perpendicular to the outwardly facing portion and at an angle relative to the first hook plane, the first and second hook members being spaced apart sufficiently to permit the first hook portion to receive respective portions of the chainstay and seatstay respectively. Preferably the first and second hooks are generally U-shaped.

The base may include spaced apart horizontal support members and a cross member extending therebetween. Preferably, the support member has an end opening and the base includes a vertically upward projecting portion operable to be received in the end opening to secure the support member to the base. Preferably, there is included locking means for locking the support member on the projecting portion, the locking means including an opening in the support member and a spring biased member projecting from the projecting member such that the spring biased member is received in the opening when the projecting member is fully received in the end opening.

Preferably, the base includes securing means for securing the support member to the base when the support member is not in use and the securing means includes first and second clips connected to the base in spaced apart relation, for receiving opposite end portions of the support member.

According to another aspect of the invention there is provided a method of supporting a bicycle, the method comprising the steps of holding a chainstay and seatstay of the bicycle in first and second spaced apart angularly disposed receptacles supported a sufficient distance above a generally horizontal surface such that a rear wheel of the bicycle is off of the horizontal surface.

According to another aspect of the invention there is provided a method of supporting a bicycle, the method comprising the steps of:

a) placing a base on a horizontal surface;

b) removably securing a support member to the base such that the support member extends upward relative to the horizontal surface;

c) placing a chainstay of the bicycle in a first receptacle secured to the support member and placing a seatstay of the bicycle in a second receptacle secured to the support member in spaced apart relation to the first receptacle and disposed at an angle relative thereto.

According to another aspect of the invention, there is provided a combination including:

a) a bicycle having a chainstay and a seatstay;

b) a base operable to rest on a generally horizontal surface;

c) a support member removably securable to the base such that the support member extends upward relative to the horizontal surface, the support member having an outwardly facing portion lying in a first generally vertical plane when the support member is secured to the base;

d) first and second bicycle holding members secured to the support member, the first and second bicycle holding members having first and second bicycle contacting surfaces respectively, for contacting the chainstay and the seatstay respectively, the first and second bicycle contacting surfaces being disposed in a second plane extending perpendicular to the first plane and disposed at an angle relative to the horizontal surface when the support member is secured to the base.

It will be appreciated that the present invention provides a convenient method of supporting a bicycle such that a rear wheel thereof is above a generally horizontal surface, to enable work to be done on portions of the bicycle near the rear wheel and to enable work requiring the bicycle in an upright position. In addition, the apparatus provides a convenient method of supporting a bicycle in an upright position for displaying a bicycle in a bicycle shop, for example. The separable nature of the supporting member and the base permits the apparatus to be collapsed and conveniently stored until further use of the apparatus is required.

BRIEF DESCRIPTION OF THE DRAWINGS

In drawings which illustrate embodiments of the invention.

DETAILED DESCRIPTION

FIG. 1

Figure 1:
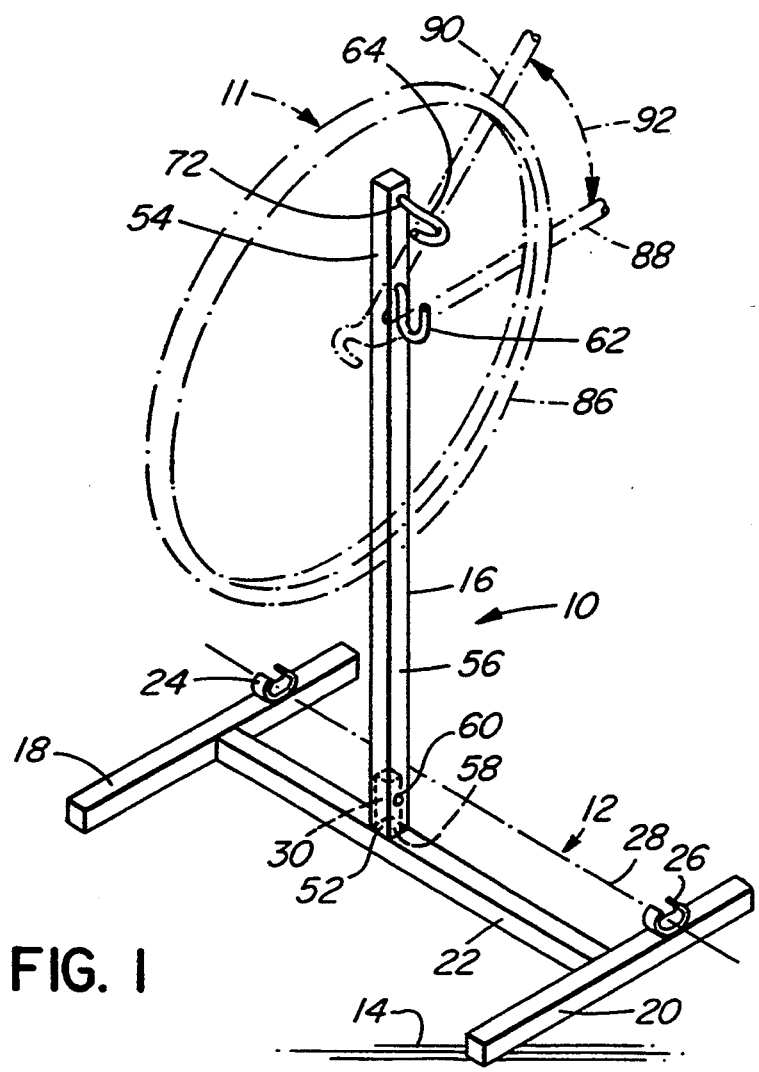
FIG. 1 is a perspective view of an apparatus according to a first embodiment of the invention.

Referring to FIG. 1, a collapsible bicycle stand apparatus according to a first embodiment of the invention is shown in solid outline at 10 holding a bicycle 11. The apparatus includes a base shown at generally at 12, the base being operable to rest on a horizontal surface 14, which commonly would be a floor. The apparatus further includes a support member 16 securable to the base such that the support member extends upward relative to the horizontal surface.

BASE

The base includes first and second spaced apart horizontal support members 18 and 20, with a cross member 22 extending therebetween. Each of these members is formed from ¾-inch tubing and the members are welded together to lie in a plane, thereby forming an "H" shape. Preferably, the first and second horizontal support members 18 and 20 are each approximately ten-inches in length and the cross member 22 is approximately sixteen-inches in length.

Secured to each horizontal support member 18 and 20 is a respective clip 24 and 26 disposed along a line 28 parallel with the cross member 22, for securing the support member 16 to the base 12 when the support member is not in use as will be described with respect to FIG. 5. The first and second clips are therefore connected to the base in spaced apart relation and act as securing means for securing the support member to the base when the support member is not in use.

FIG. 2

Figure 2:
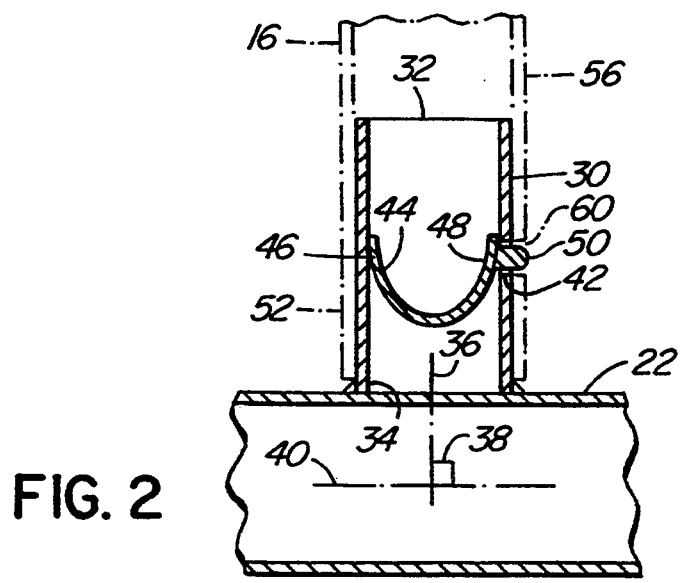
FIG. 2 is a cross-sectional view of a portion of a support member and a cross-member according to the first embodiment.

Referring back to FIG. 1, an upwardly projecting member shown in broken outline at 30 is secured to the cross member 22. Referring to FIG. 2, the upwardly projecting member is shown in solid outline and is formed from a relatively short length of 5/8-inch square tubing. Preferably, the upwardly projecting member 30 has a length of approximately three-inches as measured from a distal end portion 32 to a proximal end portion 34 thereof. The proximal end portion 34 is welded to the cross member 22 such that an axis 36 of the projecting member forms a right angle 38 with an axis 40 of the cross member 22. Therefore, when the cross member is resting on a generally horizontal surface, the projecting member 30 extends generally vertically upwards relative to the surface.

Approximately one-inch from the distal end portion 32, the upwardly projecting member 30 has an opening 42. Disposed within the upwardly projecting member 30 is a length of spring steel shown generally at 44 having a first end portion 46 and a second end portion 48. The second end portion 48 has a rounded projection 50 projecting therefrom such that the projection extends through the opening 42. The length of the spring steel member 44 is chosen such that the member may be bent into a U-shape as shown in FIG. 2, such that the first and second end portions 46 and 48 are biased away from each other thereby causing the rounded projection 50 to tend toward the position shown in FIG. 2. The rounded projection 50 is therefore spring biased to project through the opening 42.

SUPPORT MEMBER

Referring back to FIG. 1, the support member is formed from a twenty-four inch length of ¾-inch square tubing and has a first end portion 52 and a second end portion 54. The support member further includes an outwardly facing portion 56 which lies in a first generally vertical plane when the support member is secured to the base 12.

The first end portion 52 has an end opening 58 operable to receive the upwardly projecting member 30 connected to the cross member 22. The first end portion also has a lock opening 60, extending through the outwardly facing portion 56. The lock opening 60 is operable to receive the rounded projection 50 shown in FIG. 2, when the first end portion 52 is placed over the upwardly projecting member 30. The rounded projection 50 extends through the lock opening 60 and thereby interferes with movement of the support member 16 parallel to and relative to the upwardly projecting member 30. The lock opening 60 in the support member and the spring biased projection 50 therefore act as locking means for locking the support member on the projecting member 30. With the projecting portion received in the lock opening 60, the support member 16 is secured to the base.

BICYCLE HOLDING MEMBERS

The second end portion 54 includes first and second U-shaped hooks 62 and 64 which are welded in spaced apart relation to the outwardly facing portion 56 of the second end portion 54.

Figures 3, 4:
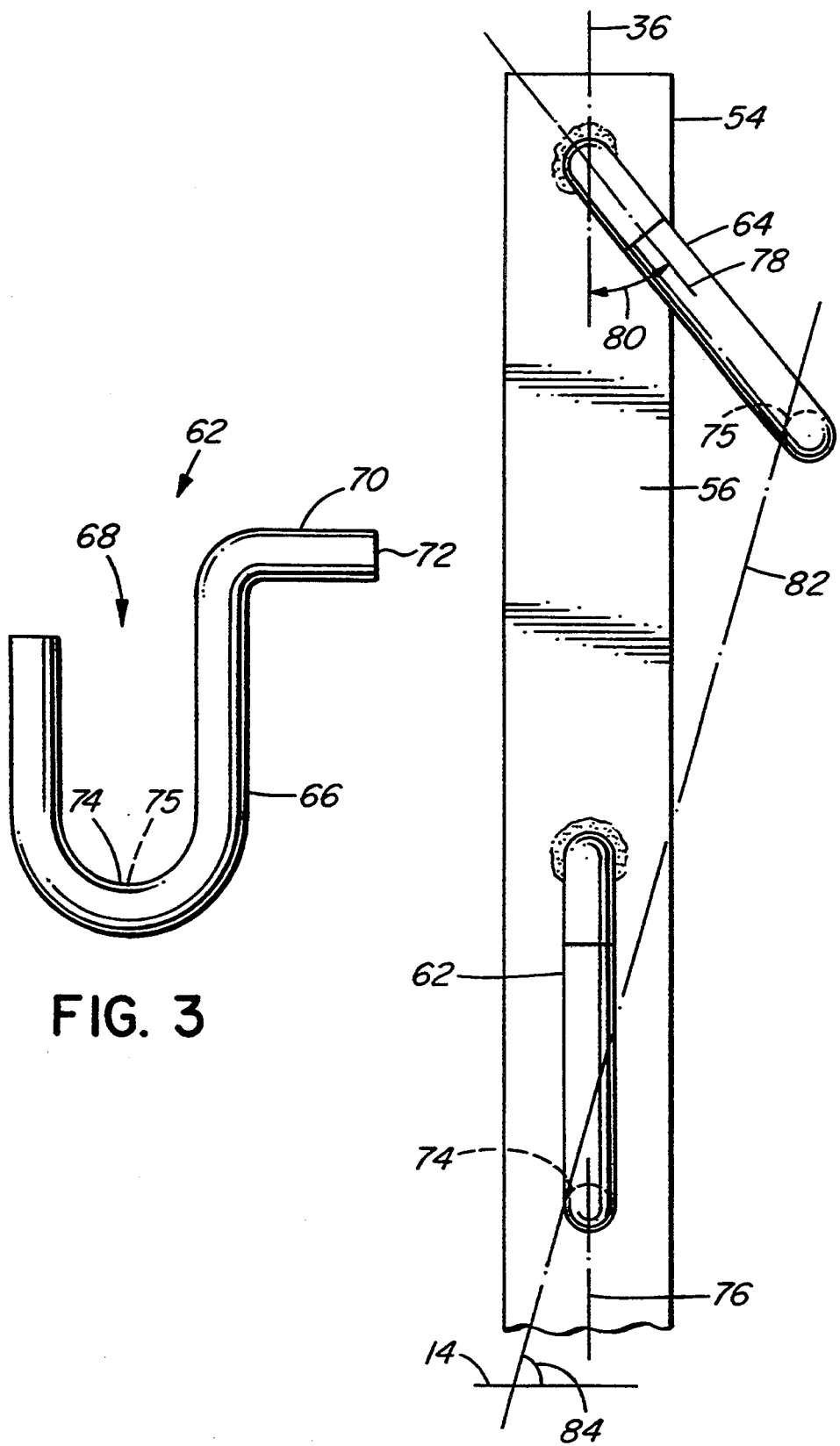
FIG. 3 is a side view of a hook member according to the first embodiment.
FIG. 4 is a plan view of a second end portion of the support member according to the first embodiment.

Referring to FIG. 3, the first hook is shown generally at 62. The hook is formed from a length of ¼-inch rod 66 bent to form a generally U-shaped portion shown generally at 68 with a laterally projecting portion 70. The laterally projecting portion has an end portion 72 which is welded to the outwardly facing portion 56 of the second end portion 54 as shown in FIG. 1. The laterally projecting portion 70 extends approximately one-inch from the end portion 72 before it bends and becomes the U-shaped portion shown generally at 68. Preferably, the U-shaped portion has a width of approximately one-inch and a depth of approximately two-inches and has a lower portion 74 which acts as a first bicycle contacting surface for contacting a portion of a bicycle held by the apparatus. The U-shape of the hook acts to receive and hold a portion of a bicycle to be held by the apparatus. Preferably, the hook is coated with a rubber covering which prevents damage to a bicycle being held by the hooks and which prevents the bicycle held by the apparatus from sliding relative to the hooks. Preferably, the first bicycle contacting surface contacts a chainstay 88 of the bicycle 11.

The second hook 64 is generally identical to the first member 62, and has a second contacting surface shown in broken outline at 75 for contacting a seatstay 90 of the bicycle 11.

Referring to FIG. 4, the first hook 62 is secured to the outwardly facing portion 56 in a first hook plane 76 coincident with the axis 36 of the support member. The first hook plane 76 extends perpendicular to the outwardly facing portion 56 and perpendicular to the horizontal surface 14.

The second hook is also secured to the outwardly facing portion 56 but is secured in a second hook plane 78 extending perpendicular to the outwardly facing portion 56 and at an angle 80 relative to the first hook plane 76. Preferably, the angle 80 is approximately 40 degrees but could be in the range of between 30 and 60 degrees, depending upon the bicycle to be held by the apparatus.

By disposing the first and second hooks in the orientations indicated, the first and second bicycle contacting surfaces 74 and 75 are disposed in a contact surface plane 82 perpendicular to the first plane in which the outwardly facing portion 56 extends and is disposed at an angle 84 relative to the horizontal surface 14. Preferably, the angle 84 is approximately 72 degrees, but may be within the range of between 60 and 80 degrees.

OPERATION

Referring to FIG. 2, the first end portion 52 of the support member 16 is placed over the upwardly projecting member 30 such that the rounded projection 50 extends through the lock opening 60 in the outwardly facing portion 56. The support member is thus secured to the base member in the position shown in FIG. 1.

Referring to FIG. 1, a rear wheel 86, chainstay 88 and seatstay 90 of the bicycle 11, shown in broken outline, is lifted off of the horizontal surface 14 such that the chainstay 88 is received in the first hook 62 and the seatstay is received in the second hook 64. The first and second hooks therefore act as first and second receptacles for receiving the chainstay and seatstay respectively of the bicycle and therefore the first and second hooks 62 and 64 act as bicycle holding means secured to the support member, for holding the bicycle. The rear wheel 86 is thus supported off of the surface 14 to display the bicycle or to enable work to be performed on it.

Referring to FIG. 2, after using the apparatus to support the bicycle, the bicycle may be removed from the apparatus simply by lifting the chainstay 88 and seatstay 90 out of the U-shaped portions of respective hooks. The rounded projection 50 may then be pressed inwardly to permit the first end portion 52 to be removed from the upwardly projecting member 30.

Figure 5:
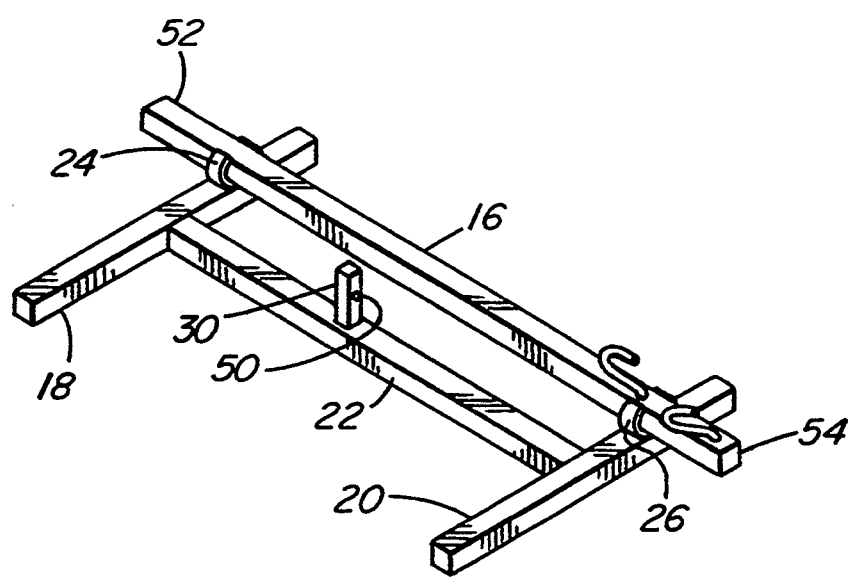
FIG. 5 is a perspective view of the first embodiment, showing the support member in a collapsed position.

Referring to FIG. 5, after the support member 16 has been removed, the first end portion 52 may be received in the first clip 24 while the second end portion 54 may be received in the second clip 26 thereby securing the support member to the base 12. A package is thus formed which is convenient and easy to store in a confined space.

ALTERNATIVES

It will be appreciated that the angle 80 between the first hook plane 76 and the second hook plane 78 is chosen to be approximately equal to an angle 92 between the chainstay and the seatstay of a conventional bicycle. In addition, for a conventional bicycle, the distance between the first bicycle contacting surface 74 and the second bicycle contacting surface 75 is approximately 5¼-inches. As bicycles come in various sizes and shapes, it will be appreciated that alternative devices may have different angles 80 corresponding to the angle between the chainstay and the seatstay of the bicycle intended to be held by the apparatus. It will further be appreciated that the angle 80 may be rendered adjustable by making the laterally projecting portion 70 shown in FIG. 5 threaded and inserting the threaded portion through openings in the end portion 54 such that by tightening a nut secured to the threaded portion, the second hook 64 may be placed in any angular orientation relative to the first hook plane 76 to accommodate bicycles having any angle between their respective chainstays and seatstays.

While specific embodiments of the invention have been described and illustrated, such embodiments should be considered illustrative of the invention only and not as limiting the invention as construed in accordance with the accompanying claims.

What is claimed is:

1. A collapsible bicycle stand apparatus comprising:
    a) a base operable to rest on a generally horizontal surface, the base including spaced apart horizontal support members and a cross member extending therebetween;
    b) a straight, elongated support member removably securable to the base such that the support member extends upward relative to the horizontal surface, the support member having an outwardly facing portion lying in a first generally vertical plane when the support member is secured to the base; and
    c) first and second bicycle holders secured to the support member for holding a bicycle, the first and second bicycle holders having first and second bicycle contacting surfaces respectively, the first and second bicycle contacting surfaces being disposed in a contacting surface plane extending perpendicular to the first plane and disposed at an angle relative to the horizontal surface when the support member is secured to the base.

2. An apparatus as claimed in claim 1 wherein the support member has an end opening and wherein the base includes an upwardly projecting portion operable to be received in the end opening to secure the support member to the base.

3. An apparatus as claimed in claim 2 further including locking means for locking the support member on the projecting portion.

4. An apparatus as claimed in claim 3 wherein the locking means includes an opening in the support member and a spring biased member projecting from the projecting member such that the spring biased member is received in the opening when the projecting member is received in the end opening.

5. A collapsible bicycle stand apparatus comprising:
a) a base operable to rest on a generally horizontal surface, the base having first and second clips connected thereto in spaced apart relation;
b) a support member removably securable to the base such that the support member extends upward relative to the horizontal surface, the support member having an outwardly facing portion lying in a first generally vertical plane when the support member is secured to the base, the support member being securable to the base by the first and second clips when the apparatus is not in use; and
c) first and second bicycle holders secured to the support member for holding a bicycle, the first and second bicycle holders having first and second bicycle contacting surfaces respectively, the first and second bicycle contacting surfaces being disposed in a contacting surface plane extending perpendicular to the first plane and disposed at an angle relative to the horizontal surface when the support member is secured to the base.

* * * * *